Sept. 18, 1934.   S. LAKE   1,973,719
APPARATUS FOR, AND METHOD OF LOCATING SUNKEN VESSELS AND OTHER OBJECTS
Filed Jan. 7, 1932   3 Sheets-Sheet 1

INVENTOR.
Simon Lake

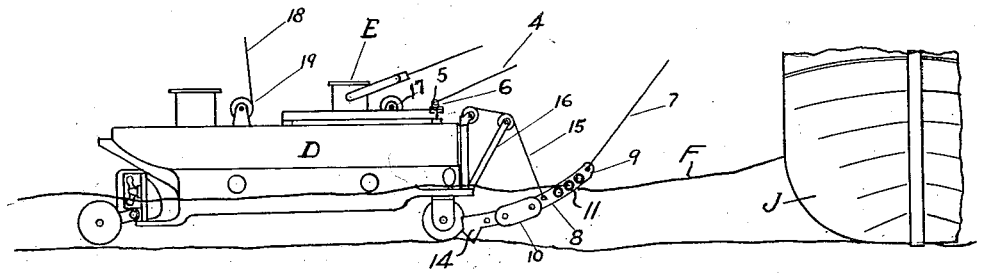
FIG. 3.
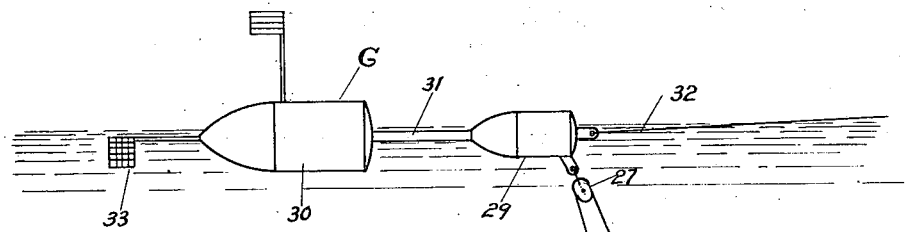
FIG. 5.
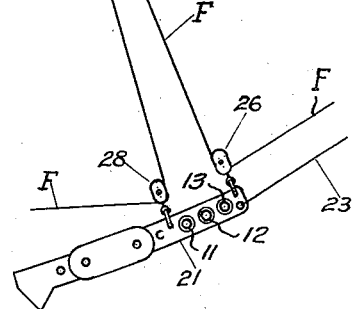

Sept. 18, 1934.    S. LAKE    1,973,719
APPARATUS FOR, AND METHOD OF LOCATING SUNKEN VESSELS AND OTHER OBJECTS
Filed Jan. 7, 1932    3 Sheets-Sheet 3

INVENTOR.
Simon Lake

Patented Sept. 18, 1934

1,973,719

UNITED STATES PATENT OFFICE 1,973,719

APPARATUS FOR AND METHOD OF LOCATING SUNKEN VESSELS AND OTHER OBJECTS

Simon Lake, Milford, Conn.

Application January 7, 1932, Serial No. 585,330

18 Claims. (Cl. 61—69)

This invention relates to apparatus for and method of locating sunken vessels and other objects, etc., such as lost anchors or any other object which projects above the normal bottom of the sea.

The object of this present improvement is to more rapidly and systematically locate and examine any object or objects which may extend above the waterbed, and is an improvement on some of my previous inventions, on which patents have been granted.

In previous methods of locating sunken vessels, especially where rocks abound which extend above the waterbed, much time has been lost in sending a diver down to investigate the object to which the sweep or drag line has become attached. This has made it necessary to bring a surface vessel nearly over the submerged object and investigate it, and then to release the sweep line and pass it over the object to enable the searching operations to proceed. The maneuvering and anchoring the surface vessel over a sunken object, especially in a strong tideway or wind, is a very difficult operation, especially in deep water.

This invention consists, primarily, of three surface vessels and a single submarine vessel or apparatus, which submarine apparatus containing an inspector, may be very quickly maneuvered to the object on which the sweep line has caught.

In this method of searching over submerged grounds I may use any type of power-propelled surface vessel, to which are fitted certain auxiliaries, as will be hereinafter described.

The submarine inspection vessel may be operated independently of a surface vessel, if desired, but such an independent submarine vessel would be very expensive to build and operate, and so I prefer to use a small submarine in connection with a surface vessel, as hereinafter described in connection with the annexed drawings, in which like parts are similarly designated.

Fig. 3 is an exterior view of a small submarine of the type shown in my co-pending application, Serial No. 568,973, carrying the center drag to the sunken object, after the sweep line has caught on the object. This type of submarine is well suited to the purpose.

Fig. 5 is an enlarged view of one of the sweep line tension regulator buoys, carried by the end surface boats, showing its attachment to one of the end drag weights.

Figure 1:
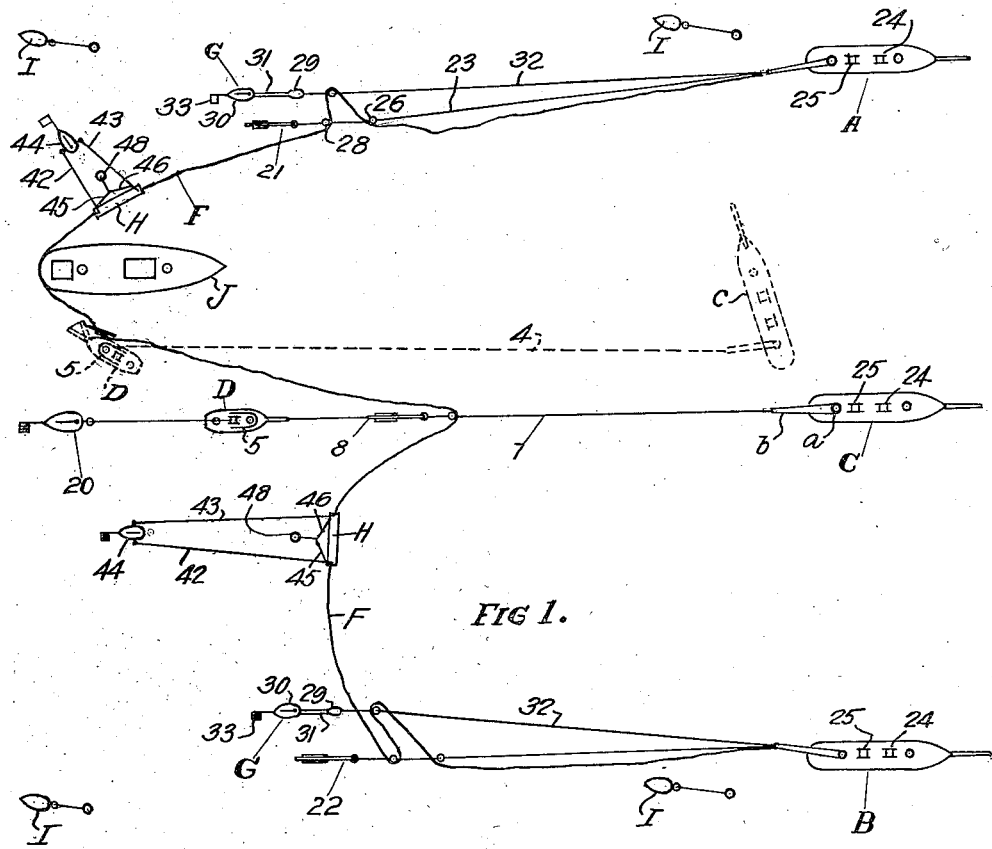
Fig. 1 is a plan view, showing diagrammatically the approximate positions of the vessels and apparatus in the act of searching over the waterbed.
Figure 2:
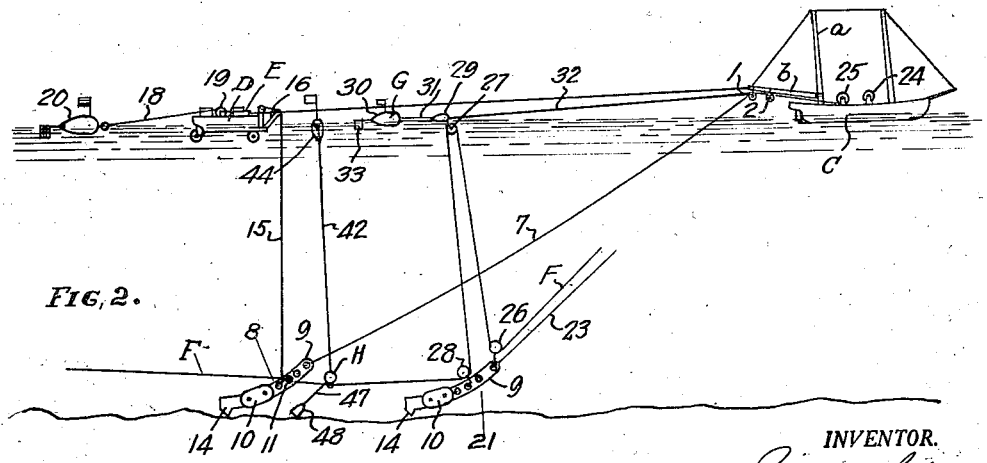
Fig. 2 shows in elevation the approximate position of the central surface vessel, which tows the submarine, as well as various other equipment and apparatus, over the waterbed.

Referring now to Fig. 1, A, B and C are surface vessels, which may be of any type of power vessel. In this instance I have indicated vessels of the auxiliary schooner type, with a fore and main mast, each carrying a boom on the mainmast near the outer ends of which I arrange suitable pulley blocks, as shown more clearly in Fig. 8, which indicates the center boat C with mast "a" and boom "b" with pulley blocks 1 and 2, which are double blocks, one carrying air hose and electric power transmission and telephone wires through one of the blocks 1 and led to the submarine D, where they enter the submarine through the sides of the conning tower E, as has been described in more detail in my co-pending application, Serial No. 568,973.

A towing line 4 passes through block 2 and leads to an I-beam traveler 5, which traveler extends above the deck of the submarine and is fitted with a sliding block 6 to which the tow line 4 is attached, the forward part of the traveler, when viewed in plan is bent to a semi-circular form, which permits the sliding block to slide around in any position desired from ahead to either broadside, depending upon how the submarine is steered, for a purpose to be later described.

Figure 4:
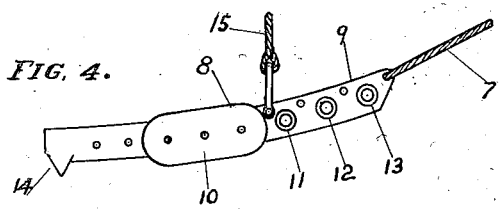
Fig. 4 is a view of the center bottom drag, which regulates the height of the sweep line above the bottom and serves, at times, as an anchor to the center boat or to the submarine.

Another line 7 leads to a drag weight 8, see Fig. 3. This drag weight is made of a flat bar 9 on which additional weights 10, more clearly shown in the enlarged view in Fig. 4, may be bolted. Weights of various sizes may be bolted to the curved bar 9 as is necessary to suit different depths of water and different speeds of current. 11, 12 and 13 are fair leads secured at varying distances from the marker end 14 of the drag weight. A line 15 leads from this drag weight to a derrick boom 16 carried at the bow of the submarine D, and this line is led to a drum 17 operated from within the submarine in a well known manner.

A line 18, wound on drum 19, also operated from within the submarine, leads to a buoy 20, which is towed behind the submarine when on the surface or is used to maintain the submarine at any desired depth, when the submarine is given negative buoyancy by the admission of water ballast in the usual manner. These are the essential devices used in connection with the center boat C.

Similar drag weights 21 and 22 are towed behind the boats A and B, see Fig. 1, but they are connected up in a different manner. They are towed by lines 23 (see Fig. 5) leading through blocks carried on the booms of the end boats and attached to drums 24 and additional line F, which I term a sweep line, leads from a drum 25 on the port end boat A and passes through a block on the boom, then downward through a block 26 on drag 21, then upwards through a block 27 which is attached to a buoy G, then downward through block 28 then through one of the fairleads, as 11, in center drag weight 8, then over to a block similar to block 28 in drag weight 22, then up to a block on the other buoy G, similar to block 27, and down to a similar block 26 and up through a block on the boom of the starboard end boat B to a drum on that boat. The drums on the surface boats A and B to which the lines and cables are attached are fitted with friction drive devices, not shown, which limit the strain that can be put upon the sweep line or towing lines, so that when an excessive predetermined strain is brought on any one of the lines the drums will allow the lines to unreel until the surface vessels can be stopped. As such friction devices are known in the art, I have not considered it necessary to further describe them. It is obvious that I could use a single block on the port end drag weight 21 as block 28, and pass the sweep line through that, and then lead direct to one of the fairleads in center drag weight 8 and thence to a single block on starboard drag weight 22 and then up to boat B, but I get a much quicker indication of the sweep line catching on an obstruction by the use of the buoys G, as will be explained later. Each buoy G is composed of two buoyant tanks 29 and 30 and tied together by a tube 31 welded in place. A line 32 leads to one of the surface vessels through a block, also carried by the boom, and hence to a small weight 32', which, when the vessels are engaged in sweeping for sunken obstructions, is also thrown overboard and tends to keep a slight tension on the line 32 at all times when the vessel is under way. The small buoyant tank 29 is designed to be of sufficient buoyancy to cause the buoy to float in a horizontal position under the normal pull of the sweepline when being towed; but upon the sweepline catching on an obstruction the buoy is pulled forward, more nearly over the drag weights on the bottom and the portion 29 thereof is drawn under the water so that the buoy assumes a nearly vertical position lifting the marker 33 above the water, and the buoyancy of the buoy G is such as to permit its being drawn under water without exceeding the safe load the sweep line is able to maintain. It can be seen that this arrangement gives a very quick indication as to when the sweepline gets caught on an obstruction and also automatically maintains a fairly uniform pull on the sweep line to prevent its being pulled off the obstruction when once caught.

In my experience in locating sunken vessels I find that I can use a mile or more of line between the outer boats A and B when searching over fairly smooth waterbeds, but where rough bottom prevails, containing rock, boulders or coral, it is not possible to sweep over such a wide pathway. I therefore propose to provide additional devices, consisting of a submersible buoyant sweepline carrier H, as shown particularly in Figs. 6, 7 and 8, whereby the sweepline may be carried at any desired distance above the bottom.

As an illustration, if a ship is sunk, the approximate location of which is known, and this ship is, say, 50 feet beam and, say, 50 ft. from keel to her top deck, and it is known, from our investigation, that the bottom is rough, then, if the sweep line is held at 25 ft. above the waterbed, and rocks or boulders do not extend over 15 or 20 ft. above the waterbed, the sweep line will pass over them, but is still near enough to the waterbed to catch on the wreck which is at least 50 ft. in height, no matter in which position the wreck lies.

Figure 6:
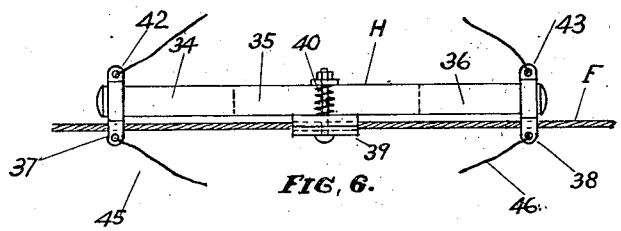
Fig. 6 is an intermediate depth regulating device used for regulating the height of the sweep line above the water bed when searching for wrecks sunk in waters in which rock or coral formations abound.
Figure 7:
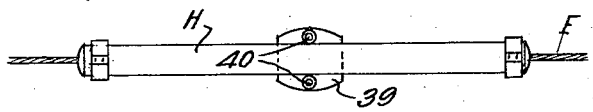
Fig. 7 is a plan view of the depth regulating device shown in Fig. 6.

The sweep line carrier H consists of a light tubular member divided into three compartments, 34, 35 and 36, by two bulkheads, as shown by dotted lines, Fig. 6. Compartment 35 is a waterballast compartment, and with this compartment empty, the carrier will float with such positive buoyancy as is necessary to carry the weight of the sweep line, which line is made of a material that will sink with only a small amount of negative buoyancy. By filling compartment 35 with waterballast the carrier H will sink to the bottom.

Fair leads 37 and 38 are secured to the lower part of the ends of the tubular carrier, and the sweep line F passes through these fairleads and also through a friction clamp 39 secured under compartment 35. This friction clamp is made in two parts, the upper part secured to the tubular member and the lower part held in position by similar bolts, springs and adjusting nuts arranged at opposite sides of the member as shown at 40. By tightening the adjusting nuts the lower half of the clamp is caused to grip the sweep line, by the tension of the springs, to any degree desired. Two lines 42 and 43 are secured to the carrier and are carried to a buoy 44 on the surface, as shown particularly in Fig. 8, and two additional lines 45 and 46 are secured in projections extending below the fairleads 37 and 38 and are joined to a single line 47 to the lower end of which is attached a small drag weight 48, so heavy as not to be lifted from the bottom by the buoyancy of carrier H. By regulating the length of line 47 it is obvious that the sweep line F may be carried by the member H at any height above the waterbed that may be desired, but as the drag is pulled along over the bottom by the sweep line it is also obvious that the retarding tendency of the drag weight will cause the sweep line to descend to the bottom unless some other force is used to prevent this down pull. The two lines 42 and 43 extending to buoy 44 on the surface accomplish this purpose, as is clearly shown in Fig. 8, where, if sweep line F is being brought towards the observer and against the current, drag weight 48 will lag behind as will also the buoy 44. Such lag will be dependent upon a number of variables, such as length of lines, speed of forward movement, weight and buoyancy of the respective elements, etc., which can readily be adjusted by a small boat traveling at the same rate of progress over the line and feeling out the height of sweep line above the bottom by the use of a "lead line."

In sweeping over smooth waterbeds, searching for anchors, lost torpedoes and other small articles, or for long-lost sunken ships, where the wooden structures of such ships have been either eaten away or destroyed by other means, so that very little extends above the surface, the carrier H may be dispensed with and the sweep line dragged over the waterbed itself.

In my investigations and operations connected with locating sunken vessels I have found that there are many obstacles not apparent to the casual student of this problem. Many vessels containing valuable cargoes have been sunk, the approximate location of which is known but which have never been found, although they have been searched for for years. It is very important to know that the entire approximate area in which a vessel has been lost is definitely searched over. A vessel may be said to have been lost in a position of, say, approximately 30 miles off some given point, as estimated by the captain or other navigating officer of the ship whose business it is to know about where his ship is at all times, but as most disasters which cause the loss of ships are due to collisions in time of fog or snow or heavy storms in which no definite position of the ship can be obtained, the navigating officer can only give his "dead reckoning" position, which is often but little more than a guess, and during the excitement of saving the lives of crew or passengers, there is no time to give to ascertaining their position when the disaster occurs. Thus, a vessel assumed to be lost, say, 30 miles southeast of a certain position may easily have been 25 or 35 miles from such estimated position. Even in Long Island Sound I found a vessel 15 miles away from the position in which several people testified they saw her go down. Their last sight of her was just before nightfall when she disappeared from their view, and they assumed she sank then, but after searching over that territory three times I came to the conclusion she had not sunk where it was thought she had, and so when I checked up and found that the tide was just turning ebb when she was supposed to have sunk I started my sweeping operations in the direction the tide would carry a drifting vessel, and found her about 15 miles from where the captain and shore observers thought she went down. I recite this instance to show the importance of knowing that the ground once searched over is thoroughly covered, otherwise the looked-for vessel might lie in a small spot that had been missed by only a few feet by the grapnels or drag line, and as it is impossible to mark on the surface of the water the area covered by the sweep lines, except by planting of a very large number of buoys, I have made provision for marking off the water bed itself, as I have found, in my navigation over the water bed, that marks made on the bottom will remain undisturbed for long periods of time.

I have found markings which I made on the bottom of Long Island Sound in only about 30 ft. of water, still plainly visible on my return to the same locality after a year.

I will now describe the procedure in searching for a sunken vessel whose position when sunk was assumed to be, say 30 miles southeast of a given point. It would depend upon how accurate the position given seemed to be, as to the procedure. If it was a latitude and longitude position, or a position that had been determined by radio bearings, or was close enough to some light ship or other fixed position to get a fairly definite location, then, if the depth and the nature of the bottom, etc. are accurately known, all these variables will have a bearing on the procedure. The point finally selected as being the most promising point will then be plotted on the chart and buoyed as the center of the area to be searched, and one of the end boats anchored at that point. As it is always desirable to sweep in line with the current (either with or against), the next procedure will be to lead the sweep line through the various blocks and fairleads carried by the drag weights on boats A, B and C, and have them take their position about as shown in Fig. 1 and lower their drag weights and sweep line F to the water bed if the bottom is smooth or if the bottom is rough the sweep line can be carried above the water bed, as has been previously described. We will assume that the boats A and B are a mile apart and that the center boat towing submarine D is half-way between, and will also assume that the current runs east and west; therefore, the three boats will start sweeping, maintaining parallel east and west courses and both the outside boats will plant marker buoys I as they proceed. In addition to the marking afforded by the surface buoys, the drag weights will cut lines into the water bed. It is obvious that any important obstructions lying on the water bed between the lines drawn on the bottom of the sea by the drags carried by boats A and B will be found by sweep line F catching on them. As soon as the sweep line catches on an obstruction there will be a tendency to draw the end boats together, unless additional line is payed out, but the blade on the marker end 14 cutting down into the waterbed will resist the side pull, with the result that the training buoys G will be rapidly drawn forward in a more direct line over the end drag weight nearest to the obstruction and will be up-ended, showing that the sweep line has fouled some obstruction. Both end boats are then anchored and the sweep line reeled in taut, so that the larger portion 30 of buoy G is partly submerged. The submarine D is then submerged, as shown in Fig. 3 and picks up drag weight 8 and follows the lead of the sweep line to the obstruction as indicated in broken lines at D', Fig. 1, towing the center boat with it. If the obstruction proves to be a wreck, such as that indicated at J, a superficial examination may be made from the submarine through its lookout windows, or the diver's door may be opened and a diver sent out to make a more detailed investigation; and if found of value, the diver attaches a buoy to the wreck, and the submarine then backs away and rises to the surface and lifts the sweep line over the wreck and the buoy on the wreck and lowers it again forward of the obstruction and again proceeds in search of further obstructions.

Figure 8:
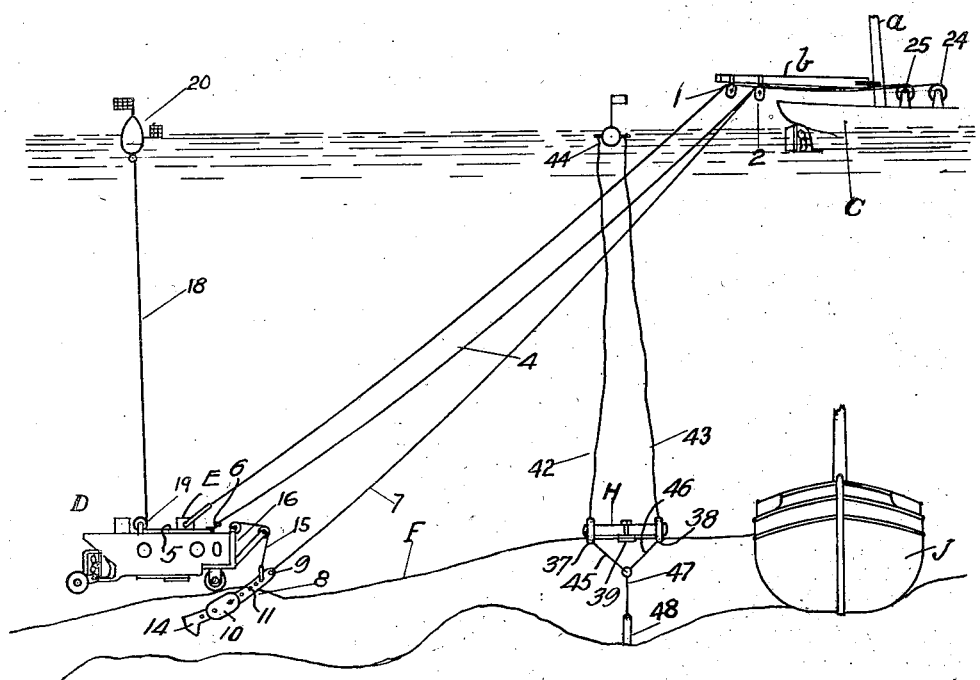
Fig. 8 is a diagrammatic view showing the position of the depth-regulating device holding the sweep line above a rocky water bed, which sweep line is caught on a sunken wreck, and also shows the submarine with center weight lifted above the bottom and following the sweep line to the wreck.

If the bottom is rough the submarine is not submerged entirely to the bottom, as is shown in Fig. 8, but is held to any desired height above the bottom by line 18 which is attached to buoy 20. The submarine follows the lead of the sweep line by the use of its propeller, the surface boat C following the buoy 20 until the observer in the submarine advises the commander of the surface boat that he has found the obstruction and the surface boat should anchor while the inspection is being made.

On the completion of the desired length of run on one course, one of the end boats comes to anchor and acts as a pivot boat, while the center boat, the submarine and opposite end surface boat swing around and lay a reverse course, the end boat, which acted as the pivot ship, then picking up the buoys I it had previously planted, thus leaving no uncovered space between the two areas swept over. In such operations it frequently happens that storms arise and the light surface marker buoys are carried away from their positions, so that it is impossible to tell from any surface indications what area has been swept over, but on allowing the submarine to descend to the bottom and steer north or south it would cross the lines of east and west courses previously run, and as the bottom markings are easily recognized, a new buoy may be planted and east and west courses renewed a little inside of the previous courses, to be sure that no unswept spots remain.

In case the wreck searched for is not found within the estimated area first plotted, additional adjoining areas may be plotted to extend the search, it being understood that, as stated, the bottom markings will remain visible for a long period of time. If a wreck location was not definitely known within 10 miles of a given point, the first area plotted to be searched would probably be laid off to cover a square extending 15 miles from the point first assumed, thus including an area of 30 x 30 miles, or 900 square miles. Assuming, from my experience, that it is possible to cover about 20 square miles per day, this would require 45 days of good weather to cover this area, and thus it will be apparent that it is very important to have definite fixed markings so as to not have to do the work over again because of spots missed. I recall one instance where a searching party was sent out to search an area where I knew a sunken ship was located, but after some days it was reported the ship was not there. I then went out with my method of more accurately checking the area swept over and found the ship we were looking for and two others in the same area previously searched over.

A somewhat more rapid method of search can be conducted by the use of two additional small observation submarines towed directly on the bottom by the end surface boats, in lieu of the end drags 21 and 22. In this manner, the planting of many surface buoys may be avoided, as on the return courses an observer may go down in one of the submarines and follow the line marked on the bottom back to the place of beginning, the surface vessel simply maintaining the proper compass course with the tow line leading to the submarine leading directly aft in line with the keel of the surface vessel. With this arrangement of multiple submarine apparatus, the sweep line may be threaded through a fairlead on the submarine, thus eliminating the end drag weights. Therefore, I do not limit myself to the exact apparatus as shown and described herein, as various modifications of apparatus may be made without departing from the spirit of the invention and the scope of the following claims.

What I claim is:

1. Apparatus for locating submerged objects, including two surface vessels carrying marker weights designed to be dragged over the waterbed, a sweep line extending from one of the surface vessels down to a block or fair lead attached above one of the weights, thence to a block or fair lead attached above a similar weight, and thence up to the other surface vessel and provided with resilient means to prevent the parting of the sweep line on its contacting with a submerged object lying on the waterbed.

2. Apparatus for locating submerged objects, including two surface vessels carrying drag weights fitted with marking blades designed to be dragged over the waterbed to mark lines thereon, a sweep line threaded through fair leads above the drag weights, the ends of the sweep line carried on a reel on each surface boat, with resilient means, and means to release the sweep line and allow it to pay out under excessive strain.

3. Apparatus for locating submerged objects, including two surface vessels carrying drag weights, a sweep line extending from one of the surface vessels through a fair lead of one drag weight down near the waterbed, thence up to a fair lead carried by a buoy on the surface, thence down to another fair lead of the said drag weight, thence to another similar drag weight carried by the other surface vessel, thence to another buoy on the surface, back to the drag weight and then to the other surface vessel.

4. Apparatus for locating submerged objects, including three surface vessels carrying drag weights provided with fair leads through which a sweep line may be threaded, and means for causing the central drag weight to travel along the sweep line, in combination with auxiliary drag weights and buoys to maintain the sweep line at a predetermined distance above the waterbed.

5. Apparatus for locating submerged objects including three surface vessels carrying drag weights for contact with the waterbed, and a sweep line, a submarine observation apparatus attached to the center surface vessel, means for raising and lowering said submarine observation apparatus and means for causing it to travel along said sweep line.

6. Apparatus for locating submerged objects, including a plurality of surface vessels, an observation submarine attached thereto, means for lowering and raising said submarine to and from the waterbed, combined with sweep means towed by said surface vessels for guiding and traversing the submarine over the waterbed, and means associated with said sweep means for leaving a distinguishing mark on the waterbed denoting the portion thereof over which the sweep means has traveled.

7. Apparatus for locating submerged objects, including a plurality of surface vessels carrying drag weights, a sweep line, means for maintaining said sweep line a predetermined distance above the waterbed, submarine observation apparatus attached to said surface vessels and their respective drag weights, and means providing for communication and a supply of air and electric current between the surface vessels and the submarine observation apparatus.

8. In apparatus for locating submerged objects, a plurality of surface vessels carrying a sweep line extending between them, weights connected with and adapted to hold the sweep line at any desired distance above the waterbed, surface buoys complemental to said weights, and means on said weights and buoys between which the sweep line is threaded to provide loops therein, a resilient predetermined tension being maintained upon the sweep line by virtue of said loops and buoys.

9. In apparatus for locating submerged objects, a plurality of surface vessels, submarine observation apparatus attached thereto, means leading from one of said surface vessels to said submarine apparatus and providing communication and serving to supply air and power and light to the submarine apparatus from said surface vessel, means for marking the waterbed over which the submarine apparatus is traversed, a sweep line extending from the submarine apparatus to submerged members connected with the surface vessels, and means to prevent parting of the sweep line upon its catching on any obstruction extending above the waterbed.

10. In apparatus for locating submerged objects, a plurality of surface vessels, a sweep line towed by certain of said surface vessels, means towed by said vessels and connected with said sweep line to maintain same in extended sweeping condition, said means including drag weights adapted for contact with the water bed and serving to maintain the sweep line submerged, a submarine observation apparatus having a connection with said sweep line, and means for propelling said submarine apparatus relatively to said sweep line while guided thereby.

11. In apparatus for locating submerged objects, a plurality of surface vessels, a sweep line towed by certain of said surface vessels, means towed by said vessels and connected with said sweep line to maintain same in extended sweeping condition, said means including drag weights adapted for contact with the water bed and serving to maintain the sweep line submerged, a submarine observation apparatus towed by another of said vessels and having a connection with said sweep line, and means for propelling said submarine apparatus relatively to said sweep line while guided thereby.

12. In apparatus for locating submerged objects, a sweep line, drag weights connected with said sweep line and acting to maintain same submerged, means for traversing said sweep line relatively to the waterbed, a submarine observation apparatus connected with said sweep line, and means buoyantly supported upon the surface of the water for maintaining said sweep line and submarine apparatus in predetermined relation to the waterbed.

13. In apparatus for locating submerged objects, a sweep line, means for traversing said sweep line relatively to the waterbed, a submarine observation apparatus connected with said sweep line, and means for suspending said sweep line at a predetermined distance above the waterbed, including a submersible member attached to said sweep line, a surface buoy supporting said submersible member and a weight connected with said submersible member and acting to hold same submerged.

14. In apparatus for locating submerged objects, a sweep line, means for traversing said sweep line relatively to the waterbed, a submarine observation apparatus connected with said sweep line, and means for suspending said sweep line at a predetermined distance above the waterbed, including a submersible member attached to said sweep line, a surface buoy supporting said submersible member, and a waterbed-contacting weight suspended from said submersible member.

15. A method of locating submerged objects, which includes sweeping successive areas of the waterbed, and producing markings on the waterbed delimiting the areas swept.

16. A method of locating submerged objects as claimed in claim 15, which includes relocating the areas formerly swept after a lapse of time by making submarine observations.

17. A method of locating submerged objects, as claimed in claim 15, which includes relocating the areas formerly swept after a lapse of time by making submarine observations, and resuming the sweeping operation over areas previously unswept as identified by the submarine observations taken.

18. A method of locating submerged objects, as claimed in claim 15, in which the sweeping and marking of the waterbed are accomplished by means operated from the surface of the water.

SIMON LAKE.